2 Sheets—Sheet 1.

A. DENNY.
AGRICULTURAL BOILER.

No. 30,467. Patented Oct. 23, 1860.

Witnesses.
Edward Bowman
M. Thompson

Inventors.
Abraham Denny
Edmund Maynard Denny

2 Sheets—Sheet 2.
A. DENNY.
AGRICULTURAL BOILER.
No. 30,467. Patented Oct. 23, 1860.
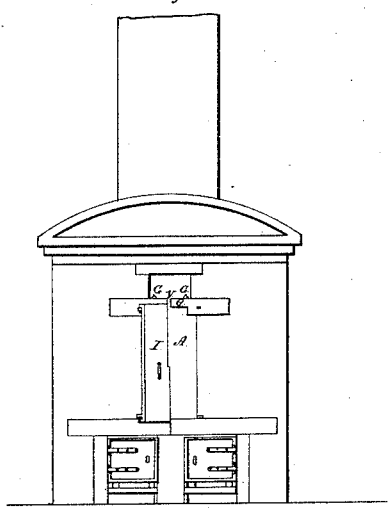
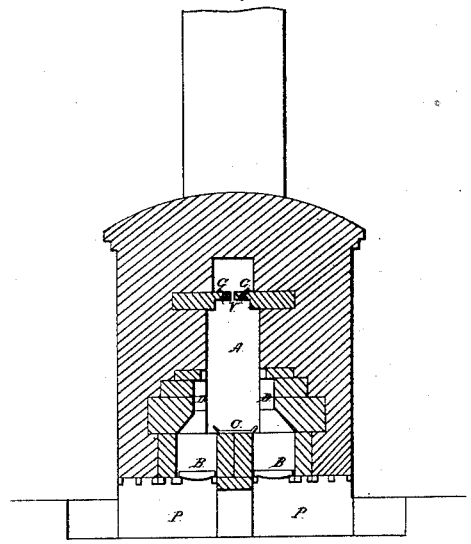
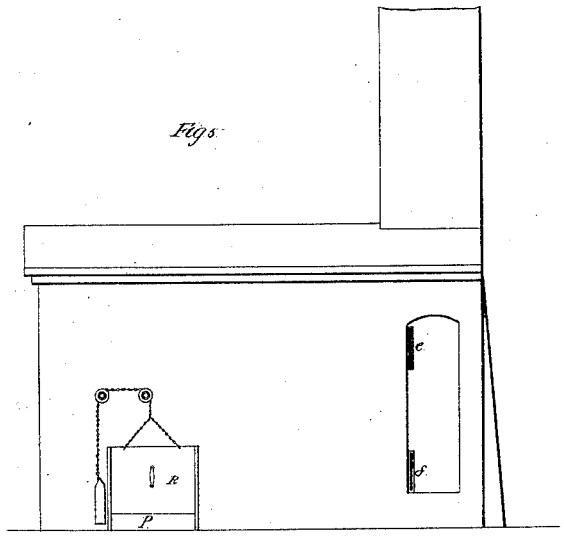
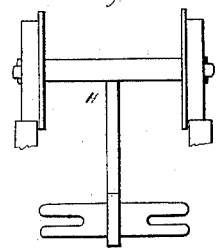
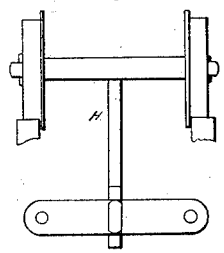

UNITED STATES PATENT OFFICE.

ABRAHAM DENNY AND EDWARD MAYNARD DENNY, OF WATERFORD, GREAT BRITAIN.

IMPROVED APPARATUS FOR SINGEING PIGS.

Specification forming part of Letters Patent No. 30,467, dated October 23, 1860.

*To all whom it may concern:*

Be it known that we, ABRAHAM DENNY and EDWARD MAYNARD DENNY, of Waterford, in the county of Waterford, Ireland, Great Britain, have invented a new Mode of and Apparatus for Singeing Pigs; and we do hereby declare that the following is a full and exact description.

This invention relates to a mode of singeing off the hairs, bristles, and other matters on pigs—that is to say, off the carcasses or dead bodies of slaughtered pigs—a process necessary to be performed in the preparation of those carcasses which are to be converted into bacon, and which process has hitherto been accomplished at a great expense by burning straw or other material. We propose to accomplish this process in a cheaper and more expeditious manner by the action of flame or heat in a stove or heated chamber, as follows:

A stove or heated chamber, made of brick, iron, or any other suitable material, is heated by a fire or fires, which may be made of coal, wood, or any other convenient substance or material, and a flue or flues from the fire or fires may partly or entirely surround the stove or heated chamber, so as to waste as little heat as possible; or the heat and flame may be allowed to pass through the stove or heated chamber, its escape into chimney-shaft being checked or regulated by the damper-commanding openings. A door or entrance to the heated chamber is provided for the introduction of the carcasses of the pigs, which may be withdrawn through the same door or passed out through another door, as may be found convenient, the pigs to be hung by suitable apparatus from the top or sides, as may be found most convenient. When the stove or heated chamber is found to be sufficiently hot, the carcass of a pig is introduced and kept there sufficiently long to singe off the whole of the hairs, bristles, and other similar matters upon its surface. Provision is made to allow of the introduction of a little flame from the fire into the stove or heated chamber in such a way as to act upon the surface of a carcass in the chamber and set fire to the hairs, bristles, and other matters upon its surface, which is readily effected after they have been dried by the heat of the stove or chamber; and that the invention may be fully understood we will proceed to describe the drawings hereunto annexed, making a part of the specification, in which—

Figure 1:
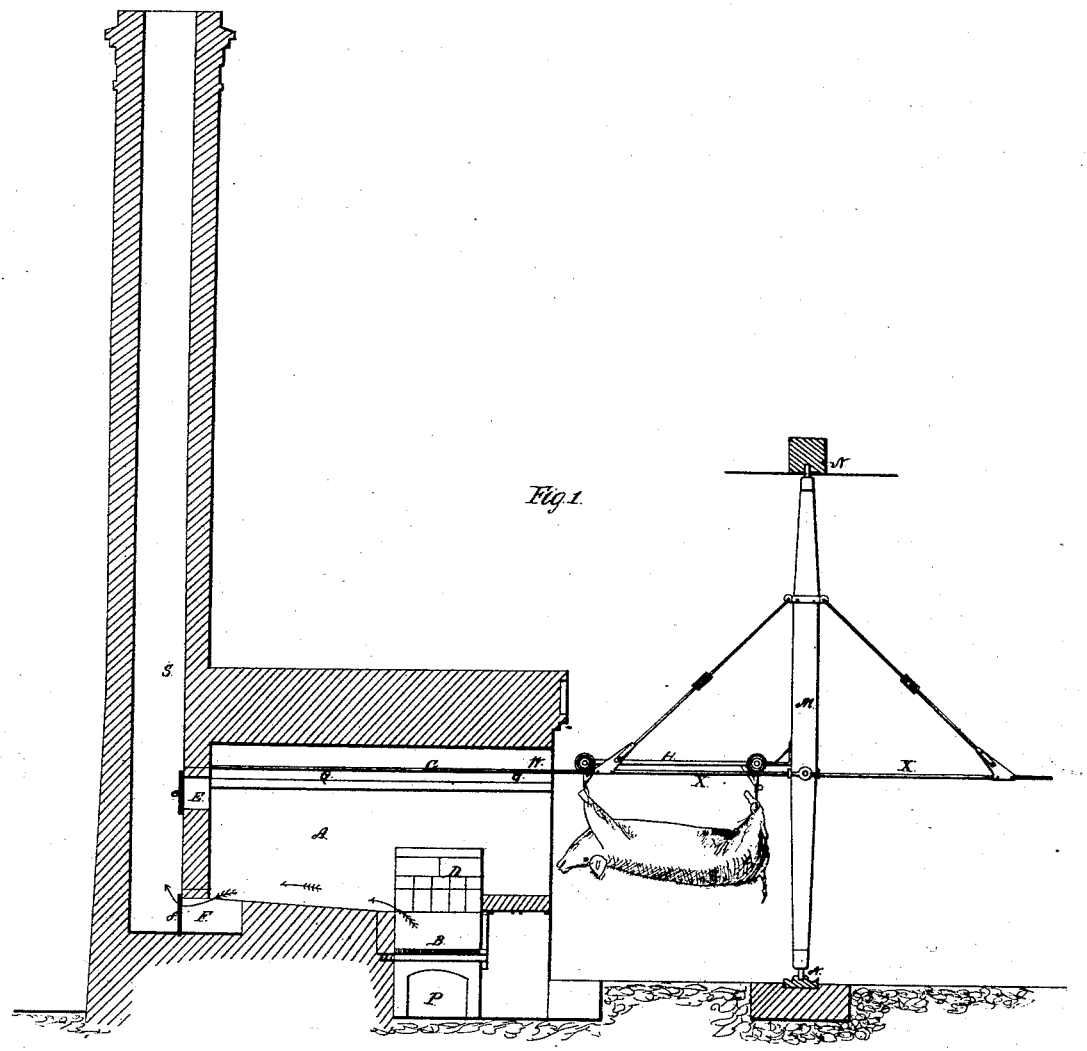
Figure 2:
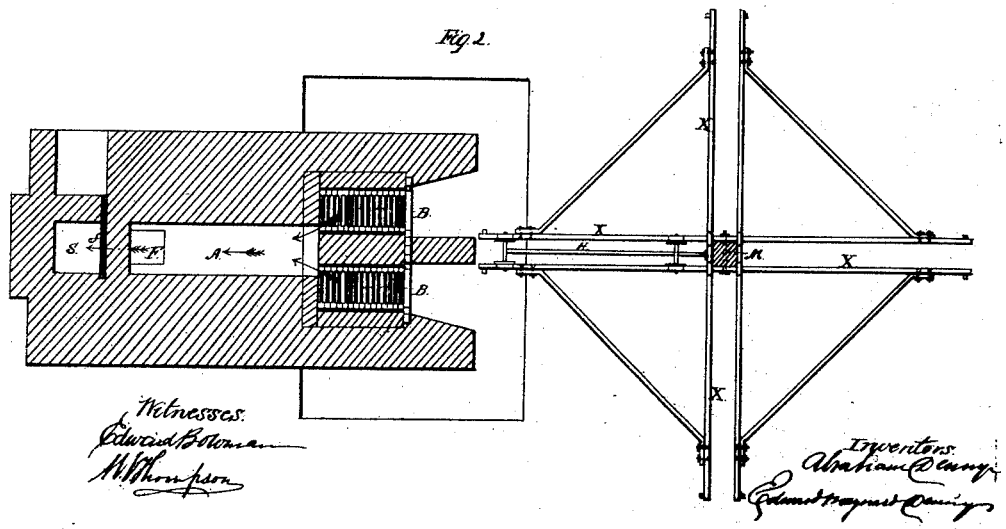

Figure 1, Sheet 1, shows a longitudinal section; Fig. 2, a sectional plan of the same; Fig. 3, Sheet 2, a front elevation; Fig. 4, Sheet 2, a transverse section; Fig. 5, Sheet 2, a longitudinal elevation without the revolving feed apparatus; Fig. 6, Sheet 2, a front elevation of the wagon to which the pigs are hung; and Fig. 7, Sheet 2, a back elevation of the same.

In each of the figures similar parts are indicated by the like letters of reference.

The arrangement shown is capable of being used for the singeing of one carcass of a pig at a time; but it may be made on a larger scale for operating upon several carcasses at a time, if desired.

A stove or chamber A is made of brickwork or other suitable material or metal, in which the carcasses of pigs are to be singed. We prefer to make this chamber of an oblong shape or form, as being more convenient for the purpose required; but we do not bind ourselves to the particular shape or form.

B B are fires for heating the said chamber or stove, which we prefer to arrange parallel and opposite to each other, as shown in the drawings. The same result might, however, be obtained by more or less fires arranged in a suitable manner. The flames from these fires have or may be allowed to have vent into the chamber wholly or in part or at such points, either in the floor or sides or elsewhere, as may be found effective. The direction of the current of hot air from the fires is indicated in the drawings by the arrows, and passes through the chamber A and the flue F. The two flues E and F communicate with the chimney-shaft S, and dampers are placed at *e* and *f* to open, close, and regulate the communication of the flues with the shaft S. On lighting the fires the damper in the upper flue E is opened for the purpose of heating the stove or chamber, and in working the chamber or stove the lower flue F is opened and the upper one E is closed, or either may be partially closed, accordingly as it may be found desirable for the purpose of producing the requisite effect upon the surface of a carcass in the stove or chamber.

Air-flues P P are formed under the fires—one at each side of the apparatus—which may or may not communicate with each other for the purpose of obtaining the requisite quantity of air to feed the fires. These flues can be closed or opened by means of doors R, attached thereto. Should it be necessary to increase the draft, it may be effected by a fan or other apparatus driven by hand, steam, or other power.

On the center block or division separating the fires is placed a tray or fire-guard C, which protects the back of the pig's carcass from the direct action of the fire. The sides D D of the chamber over the fires are so formed as to direct the flame inward onto a carcass in the furnace, stove, or heated chamber.

The rails or guides G G for the reception of the wheeled wagon or truck H are fixed on covering-stones or fire-blocks Q Q at the top of the chamber. The carcass of a pig to be singed is hung or suspended by suitable apparatus to the said wheeled wagon or truck H, as shown in the drawings. I I are the doors of the stove or chamber A. (See Fig. 3, Sheet 2.) One door only is shown in the drawings. A small space is left between the upper part of these doors for the purpose of passing through a fork to withdraw the wagon to which the carcass is suspended, when the carcass is seen to be sufficiently singed, the space or opening also serving as a sight-hole. The covering stones or blocks Q Q, upon which the rails are laid, are separated by a narrow opening V to permit the passage of the rods or bars of the wagon to which the carcass of the pig is suspended. At the entrance to the wagon-chamber W may be fixed a door or flap, to be closed when lighting the fires, and may remain up during the working of the stove or heated chamber.

The mode of operation is as follows: The damper in the flue E is first opened and fires lighted in the fire-places B B. When the stove or chamber is made sufficiently hot, the damper in the flue E is closed and the flue F opened, or each may be partially opened, as may be found desirable. The carcass of a pig is then suspended to a wagon or truck H, outside the chamber, by means of chains, hooks, or other suitable apparatus, in the position shown in the drawings. When thus secured, the doors I I are opened. The wagon or truck, with the carcass suspended beneath it, is then pushed inside the chamber A, when the doors are immediately closed. The wagon is advanced till the carcass passes through the flames, and is then drawn back by means of a fork, which takes an eye fixed in back of wagon, after the carcass has been kept sufficiently long to singe off the whole of the hairs, bristles, and other matters, which is quickly accomplished by the heat of the chamber, which dries them, and the flames from the fires B B, which set them on fire. The operator, by looking through the opening left between the doors I I, can see when a carcass has been in sufficiently long, and by means of a fork passed through the said opening and dropped into eye in back of wagon the carcass of the pig may be withdrawn. To facilitate the labor of introducing the carcasses of pigs into the stove or heated chamber A, a revolving feed apparatus may be used, constructed as follows:

M is an upright post turning in suitable bearings upon pivots N N, fixed at the extremities thereof. Fixed vertically to the uprights M are four sets of rails X X X X, similar to those marked G, in the stove or heated chamber, and at the same height as the rails G. A carcass of a pig is suspended to the wagon H upon any of the sets of rails, as may be found convenient, and the apparatus is then made to revolve till the rails come opposite those in the chamber, when it may be secured by a latch or catch. The wagon, with the carcass suspended, is then pushed into the stove or heated chamber. On withdrawing it it is again pushed onto the same set of rails. The catch is then released and the next set of rails brought opposite the stove, as before. While the above operation is performing, the carcass previously singed is being unhooked from the wagon on one set of rails, while another carcass is being hung on the other, and the fourth set of rails occupied by a wagon with carcass suspended, ready for delivery into the stove. We do not claim as of our invention any of the parts of the apparatus shown in the drawings and above described separate or apart from the combination and arrangement thereof in manner and for the purpose above described.

What we claim as our invention, and desire to secure by Letters Patent, is—

The apparatus for singeing off the bristles, hairs, and other superfluous matters upon the surfaces of the carcasses of pigs by the action of flame or heat in a stove or heated chamber, substantially as hereinbefore specified.

ABRAHAM DENNY.
      EDWARD MAYNARD DENNY.

Witnesses:
 EDWARD BOWMAN,
 W. S. THOMPSON.